Dec. 27, 1966 T. J. GAUDYN 3,293,983
NON-STEREO DEPTH PERCEPTION PROJECTION DISPLAY DEVICE
Filed Jan. 28, 1965
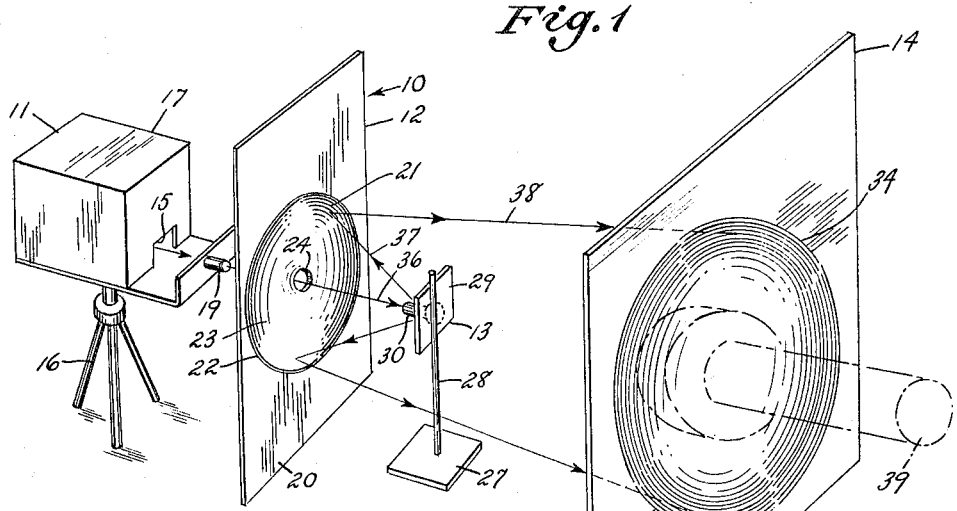
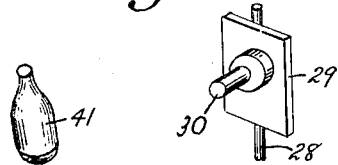
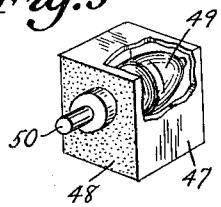
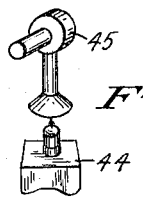
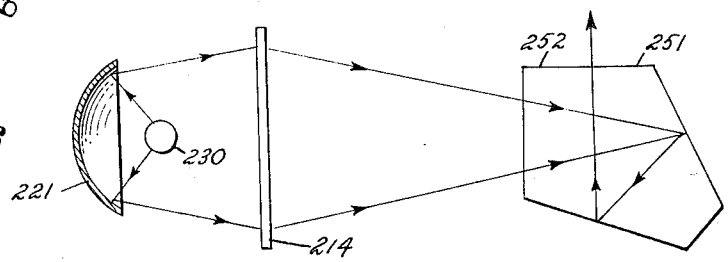
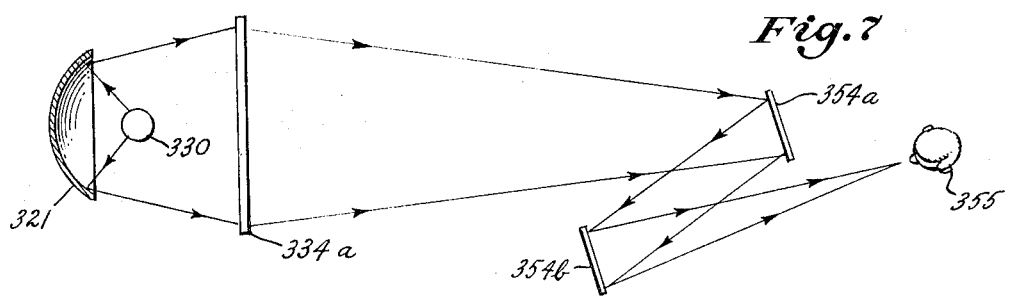

United States Patent Office 3,293,983
Patented Dec. 27, 1966

3,293,983
NON-STEREO DEPTH PERCEPTION PROJECTION DISPLAY DEVICE
Tad J. Gaudyn, % Maritza Guzman Esquilin, Box 22568, U.P.R. Station, Rio Piedras, Puerto Rico 00925
Filed Jan. 28, 1965, Ser. No. 428,762
4 Claims. (Cl. 88—24)

This invention relates generally to the field of optically projecting display devices, and more particularly to an improved reflecting type enlarging device which will present to the viewer a three dimensional virtual image of a displayed object in free vision without the help of any type of viewing spectacles, polarizing or colored filters, viewing devices or intricate screens.

It is among the principal objects of the present invention to provide an improved optical system, in which the displayed image may be viewed from a relatively wide viewing area, thereby permitting the presentation of the image to a plurality of viewers simultaneously.

Another object of the invention lies in the provision of an improved optical system, in which, possessed of the above advantage, the cost of fabrication may be of a reasonably low order, with consequent wide sale, distribution and use.

Another object of the invention lies in the provision of an non-stereo depth perception optical projection system capable of presenting a virtual image to a viewer which will be in accurate perspective, and without perceptible distortion.

Yet another object of the invention lies in the provision of an improved non-stereo depth perception instrument which may be employed as an optical comparator and similar application.

A feature of the invention lies in the fact that the inventive structure may be employed in conjunction with a wide variety of object lighting arrangements.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

FIGURE 1 is a schematic view in perspective showing an embodiment of the invention.

FIGURE 2 is a fragmentary view in perspective showing structure for supporting an object the image of which is projected.

FIGURE 3 is a fragmentary view in perspective showing an alternate form of object lighting.

FIGURE 4 is a fragmentary view in perspective showing a second alternate form of lighting arrangement.

FIGURE 5 is a fragmentary view in perspective, partially broken away to show detail, showing a third alternate form of lighting arrangement.

FIGURE 6 is a schematic view showing a second embodiment of the invention.

FIGURE 7 is a schematic view of a third embodiment of the invention.

In accordance with the first embodiment of the invention, the device, generally indicated by reference character 10, comprises broadly: a light ray illumination source 11, a parabolic mirror element 12, an object supporting element 13, and a fresnel lens element 14.

As seen in FIGURE 1, the illumination source 11 may include a suitable supporting means 16, and a light housing 17, enclosing an incandescent lamp (not shown). The housing includes an opening 15, through which light rays emerge to a projecting lens 19.

The parabolic mirror element 12 includes mounting means 20 which may form one wall of a generally rectangular housing (not shown) and includes a parabolic mirror 21, the annular periphery 22 of which is installed in a similarly sized opening in the wall 20. The inner surface 23 is silvered, with the exception of a small circular area 24 through which light rays emanating from the lens 19 may enter.

The object supporting element 13 may be of any desired construction, and as seen in FIGURE 1 in the drawing, includes a base member 27 mounting a vertical column 28, the column 28 supporting a suitable background member 29 upon which the displayed object 30 is mounted. The object 30 is preferably oriented coaxially with respect to the axis of the unsilvered area 24, and may be moved toward and away from the mirror 21 to achieve proper focus.

The fresnel lens element 14 may be mounted in a wall 33 of the above mentioned housing (not shown) and includes a conventional fresnel lens 34, the focus of which determines the position with respect to the mirror 21.

During use, the light rays 36 emanating from the source 11 pass through the lens 19 to illuminate the object 30. Reflected rays in turn strike the silvered surface 23 from whence they are reflected upon the fresnel lens 34. It will be observed that the rays 37 which are reflected from the object upon striking the surface 23 are diverged as at 38 by positioning the displayed object 30 substantially inside the actual focus point of the mirror 21; the degree of divergence desired being determined by the effective diameter of the fresnel lens 34. Upon viewing the virtual image 39 from the right-hand side of the wall 33, there will be observed an enlarged three dimensional non-stereo representation of the object 30, as indicated by reference character 39.

In the alternate form of illumination means shown in FIGURE 3, the light ray source 11 has substituted for it, a plurality of reflector flood type incandescent lamps 41 wich may be positioned as desired to obtain a non-uniform lighting effect particularly side lighting. This type of lighting arrangement is especially suited for the device 10 when it is used as an advertising display, as opposed to a scientific application such as an optical comparator.

This is also true of the lighting variation shown in FIGURE 4, in which the object supporting element 13 is replaced by a transparent light conducting support member 44 which in turn carries the display object 45. Both the support 44 and the object 45 may be composed of internal light reflecting material such as methyl methacrylate or other material having similar physical characteristics.

In FIGURE 5, the light ray source 11 is substituted by a light housing 47 formed integrally with a translucent background pane 48 and containing an illuminating source 49, the displayed object 50 being positioned within an opening in the wall 48, or in front thereof.

Turning to the second embodiment illustrated in FIGURE 6, parts corresponding to those of the first embodiment have been designated by similar reference characters "2," thereby avoiding unnecessary repetition.

The second embodiment differs from the first embodiment in the provision of a glass pentaprism 251 positioned adjacent the fresnel lens element 214, in which the light rays are changed in direction and presented upon a face 252 of the pentaprism 251, wherein the image may be viewed from a plurality of viewing points 253. This embodiment is particularly useful where the representation is to be simultaneously viewed by a number of viewers.

Turning now to the third embodiment of the invention, parts corresponding to those of the first embodiment have been designated by similar reference characters with the additional prefix "3." This embodiment differs from the principal embodiment in the provision of a plurality of angularly disposed planar mirrors 354a and 354b to permit an increased length of throw so that in viewing the image, as from point 355 the position of the viewer laterally of the axis of the rays is less critical.

It may thus be seen that I have invented a novel and highly useful improvement in virtual image display devices, in which by the use of two simple optical elements, namely a parabolic mirror and a fresnel lens, it is possible to display a three dimensional depth perception projection image of any desired three dimensional object. By varying the size of the two elements, it is possible to accommodate almost any size object to be projected, and of any reasonable non-linear configuration. Depending upon the optical effect desired, the illumination of the projected object may be varied to achieve a completely illuminated projected image, or a silhouette or outline of the projected object (using the lighting arrangement shown in FIGURE 5 of the drawings).

I wish it to be understood that I do not consider the invention limited to the precise details of structure shown and set forh in this specificaion, for obvious modifications will occur to those skilled in the art to which the invention pertains.

I claim:

1. An optically projecting display device comprising: a light source; a displayed object supporting means positioned in the path of said light source, a parabolic mirror focused substantially upon said displayed object supporting means in such manner as to reflect rays from the displayed object in diverging paths; and a fresnel lens; said fresnel lens being focused by reflection upon said mirror upon said object supporting means.

2. An optically projecting display device comprising: a light source; a displayed object supporting means positioned in the path of said light source, a parabolic mirror focused substantially upon said displayed object supporting means in such manner as to reflect rays from the displayed object in diverging paths; and a fresnel lens of effective diameter substantially greater than that of said mirror and focused by reflection upon said mirror upon said object supporting means.

3. An optically projecting display device comprising: a light source; a displayed object supporting means positioned in the path of said light source, a parabolic mirror focused substantially upon said displayed object supporting means in such manner as to reflect rays from the displayed object in diverging paths; and a fresnel lens; focused by reflection upon said mirror upon said object supporting means.

4. An optically projecting display device comprising: a light source; a displayed object supporting means positioned in the path of said light source, a parabolic mirror focused substantially upon said displayed object supporting means in such manner as to reflect rays from the displayed object in diverging paths; and a fresnel lens focused by reflection upon said mirror upon said object supporting means; said mirror having a centrally disposed area through which rays emanating from said light source may pass to illuminate the displayed object.

References Cited by the Examiner

UNITED STATES PATENTS

| | | | |
|---|---|---|---|
| 995,607 | 6/1911 | Kempinski | 88—57 |
| 1,699,689 | 1/1929 | Curry | 88—57 |
| 2,045,120 | 6/1936 | Carpenter | 88—57 |
| 2,576,147 | 11/1951 | Zauvage | 88—57 |
| 2,726,573 | 12/1955 | Maloff | 88—57 |

NORTON ANSHER, *Primary Examiner.*

VANCE A. SMITH, *Assistant Examiner.*